US010464513B2

(12) United States Patent
Karlsson et al.

(10) Patent No.: US 10,464,513 B2
(45) Date of Patent: Nov. 5, 2019

(54) FRONT BUMPER SYSTEM FOR A VEHICLE

(71) Applicant: Volvo Car Corporation, Gothenburg (SE)

(72) Inventors: Daniel Karlsson, Ytterby (SE); Jens Raine, Varberg (SE); Jan-Erik Larsson, Savedalen (SE); Martin Swahn, Halso (SE); Frida Madsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/869,561

(22) Filed: Jan. 12, 2018

(65) Prior Publication Data

US 2018/0257590 A1  Sep. 13, 2018

(30) Foreign Application Priority Data

Mar. 9, 2017  (EP) .................................... 17160042

(51) Int. Cl.
*B60R 19/34* (2006.01)
*B62D 21/15* (2006.01)
*B60R 19/18* (2006.01)
*B62D 25/08* (2006.01)

(52) U.S. Cl.
CPC ............ *B60R 19/34* (2013.01); *B62D 21/152* (2013.01); *B60R 2019/182* (2013.01); *B62D 25/085* (2013.01)

(58) Field of Classification Search
CPC .............................. B60R 19/34; B62D 21/152

USPC .................. 296/187.09, 187.1; 293/132, 133
See application file for complete search history.

(56) References Cited

U.S. PATENT DOCUMENTS

| 2014/0159420 A1 | 6/2014 | Hashimoto et al. |
| 2015/0336525 A1* | 11/2015 | Nam ........................ B60R 19/04 |
| | | 296/187.1 |
| 2015/0375789 A1* | 12/2015 | Kitakata .............. B62D 21/152 |
| | | 296/187.1 |

FOREIGN PATENT DOCUMENTS

WO    2016069320 A1    5/2016

* cited by examiner

*Primary Examiner* — Joseph D. Pape
(74) *Attorney, Agent, or Firm* — Snyder, Clark, Lesch & Chung, LLP

(57) ABSTRACT

The present invention relates to a front bumper system for a vehicle. A pair of front side members is arranged along a front-rear direction of the vehicle and arranged on opposite sides of the vehicle and on opposite sides of a cross member structure of the vehicle. Pair of crash box units are mechanically fixated to the front side members. A front bumper is laterally disposed and mechanically fixated to each of the crash box units. A lateral push element is mechanically fixed to one of the crash box units and being arranged to provide a load transfer path via the cross member structure towards the opposing front side member such that at least the front side member on the side of the lateral push element is moved towards the opposing front side member in the event of a crash.

12 Claims, 4 Drawing Sheets

FRONT BUMPER SYSTEM FOR A VEHICLE

This application claims priority under 35 U.S.C. 119 based on European Patent Application No. 17160042.2 filed on Mar. 9, 2017, the disclosure of which is incorporated by reference herein.

FIELD OF THE INVENTION

The present invention relates to a front bumper system for a vehicle.

BACKGROUND OF THE INVENTION

The safety aspects of vehicles are excessively evaluated and vehicles are being equipped with increasingly advanced safety systems. Apart from electronic safety systems, the structure of the vehicle itself may also be particularly designed to behave in a predetermined way in case of an impact with a foreign object or a person.

Accordingly, the front structures of a vehicle are commonly designed such that in case of a so-called small overlap collision, the vehicle is intended to move sideways away from the imparting object. This may be accomplished by designing the front structure of the vehicle such that a lateral force is generated acting on the vehicle as a result of the impact. The benefit of this is that less energy is transferred to the vehicle main structure which thereby protects the occupants of the vehicle. For example, the acceleration forces on the occupants may be reduced by introducing a side-way movement of the vehicle in case of a small overlap collision.

U.S. Pat. No. 9,290,138 describes one example of a vehicle front section which is capable of generating such a lateral force in the event of a small overlap collision. The front section of U.S. Pat. No. 9,290,138 comprising a crash box attached to a bumper and a front side member. Attached on the outer side of the front side member there is a projection member intended to transfer collision load through the front side member to the power unit of the vehicle.

However, the front section of U.S. Pat. No. 9,290,138 may be subject to several improvements. For example, the transfer of the lateral force may be achieved in a more efficient way.

SUMMARY

In view of above-mentioned prior art, it is an object of the present invention to provide a front bumper system for a vehicle with improved transfer of lateral force.

According to a first aspect of the invention, there is provided a front bumper system for a vehicle, the front bumper system comprising: a pair of front side members arranged along a front-rear direction of the vehicle, the pair of front side members being arranged on opposite sides of the vehicle and on opposite sides of a cross member structure of the vehicle; a pair of crash box units, wherein one of the crash box units is mechanically fixated to one of the front side members, and the other one of the crash box units being mechanically fixated to the other one of the front side members, the crash box units being configured to absorb collision energy by being deformed in the event of a collision; a front bumper laterally disposed with respect to the front-rear direction of the vehicle and mechanically fixated to each of the crash box units, and a lateral push element mechanically fixed to one of the crash box units and protruding in a lateral direction from the crash box unit with respect to the front-rear direction of the vehicle and towards the side of the vehicle at which the crash box unit is arranged, the lateral push element being arranged to, in the event of a collision, provide a load transfer path for transferring a load, via the cross member structure towards the opposing front side member, whereby at least the front side member on the side of the lateral push element is adapted to move in response to the load transfer towards the opposing front side.

The present invention is based on the realization that in order to improve the lateral motion of the vehicle in the event of a small overlap collision it is advantageous to arrange the lateral push element further to the front of the vehicle. The crash box is generally arranged directly behind the bumper of a vehicle, thus, to improve the lateral motion it is beneficial to attach the lateral push element to the crash box. In this way, the lateral motion occurs earlier in the collision event compared to having the lateral push element further back in the front bumper system. In addition, by having the lateral push element further to the front, i.e. attached to the crash box, the portion of the outer surface of the vehicle being imparted in the collision is reduced which may reduce the damage on the imparting object and the vehicle caused by the collision.

Accordingly, the invention is based on providing a load transfer path between a cash box on one side of the vehicle to a front side member opposite the cross member structure of the vehicle.

The front side members are configured to absorb energy in the event of a crash as a primary function. The front side members may also support components or structures of the vehicle and may be connected to the engine structure of the vehicle.

According to one embodiment, the lateral pusher element is arranged at the rear end portion of the crash box. In this way, a more efficient transfer of load from the lateral push element via the front side members to the opposing front side member is provided. This improved transfer is obtained by utilizing the stiffness in the front side member to transfer the load. The stiffness of the front side member is generally higher than the stiffness of the crash box member.

According to one embodiment, the lateral push element may be adapted to protrude further in the lateral direction compared to the front bumper. Thereby, in the event of a small overlap collision, the lateral push element takes the first impact and instead of the front bumper. This advantageously provides for a vehicle design which enables a reduced lateral extension of the vehicle which may improve the traffic situation for pedestrians in the vicinity of the vehicle. In other words, for sufficient pedestrian safety, the width of a front bumper of a vehicle should not be excessively large. However, in prior art solutions, the bumper traditionally extends beyond the crash box for improving transfer of load in case of a crash event, thereby being in conflict with the pedestrian safety restriction. Thus, according to this embodiment, the front bumper does advantageously not extend side-way in the lateral direction beyond the lateral push element. Furthermore, the crash box may extend further or equally in the in the lateral direction than the front bumper.

The lateral push element may comprise aluminum. The lateral push element may even be made entirely from aluminum. This provides for a light weight lateral push element with adequate mechanical strength.

The lateral push element may be manufactured by extrusion. In this way, the design of the lateral push element is more flexible and the extrusion process provides for enabling more adapted design of the lateral push element. Furthermore, mechanically fixing the lateral push element to the crash box may be made in a more robust way as a consequence of being manufactured by extrusion. Furthermore, using extrusion is cost-effective. Extrusion also allows for manufacturing a light weight lateral push element with relatively high mechanical strength.

According to one embodiment, the lateral push element may be arranged with the extrusion direction substantially perpendicular to the lateral direction. The mechanical strength of an item made by extrusion is different depending on in which direction the item is subjected to a force. Perpendicular to the extrusion direction, an extruded item is strongest and less prone to deformation. A lateral push element is advantageously not permanently deformed by the load of the crash impact, instead the load should be transferred laterally. Therefore, the lateral push element is advantageously arranged with its strongest orientation substantially along the lateral direction, this means that the extrusion direction should be perpendicular to the lateral direction. The extrusion direction is the direction in which the extrusion process is carried out, i.e. the direction that the lateral push element was extruded ("manufactured").

Additionally, the mechanical fixing between the lateral push element and the crash box may be accomplished by a screw and nut, or a riveting fastening means.

The cross member structure may be a vehicle engine structure comprise the engine itself, and/or a transmission, Furthermore, in case of an electric or hybrid vehicle other types of cross members may be used such as beams or other frame structures of the vehicle. The cross member structure may in some embodiments be mechanically fixated to the front side members. In other words, mechanical fixtures between the front side members and the e.g. engine structure provides for an efficient load transfer path across the vehicle from one side to the other side.

Additionally, there may in some embodiments be a reinforcement element arranged between a front side member and a respective crash box unit, the reinforcement element is adapted to mechanically reinforce the crash box unit in the lateral direction, wherein a portion of the reinforcement element is arranged to extend between a crash box unit and a lateral push element and in contact with the crash box unit. The portion of the reinforcement element is a plate like structure. The reinforcement element advantageously improves the stability of the crash box unit such that the force from the lateral push element is transferred more efficiently in the lateral direction without collapsing the crash box unit.

According to a second aspect of the invention, there is provided a vehicle comprising the front bumper system according to any one of the embodiments of the first aspect.

In summary, the present invention relates to a front bumper system for a vehicle. A pair of front side members is arranged along a front-rear direction of the vehicle and arranged on opposite sides of the vehicle and on opposite sides of a cross member structure of the vehicle. A pair of crash box units is each mechanically fixated to a respective one of the front side members. A front bumper is laterally disposed and mechanically fixated to each of the crash box units. A lateral push element is mechanically fixed to one of the crash box units and being arranged to provide a load transfer path via the cross member structure towards the opposing front side member such that at least the front side member on the side of the lateral push element is moved towards the opposing front side member in the event of a crash.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1:
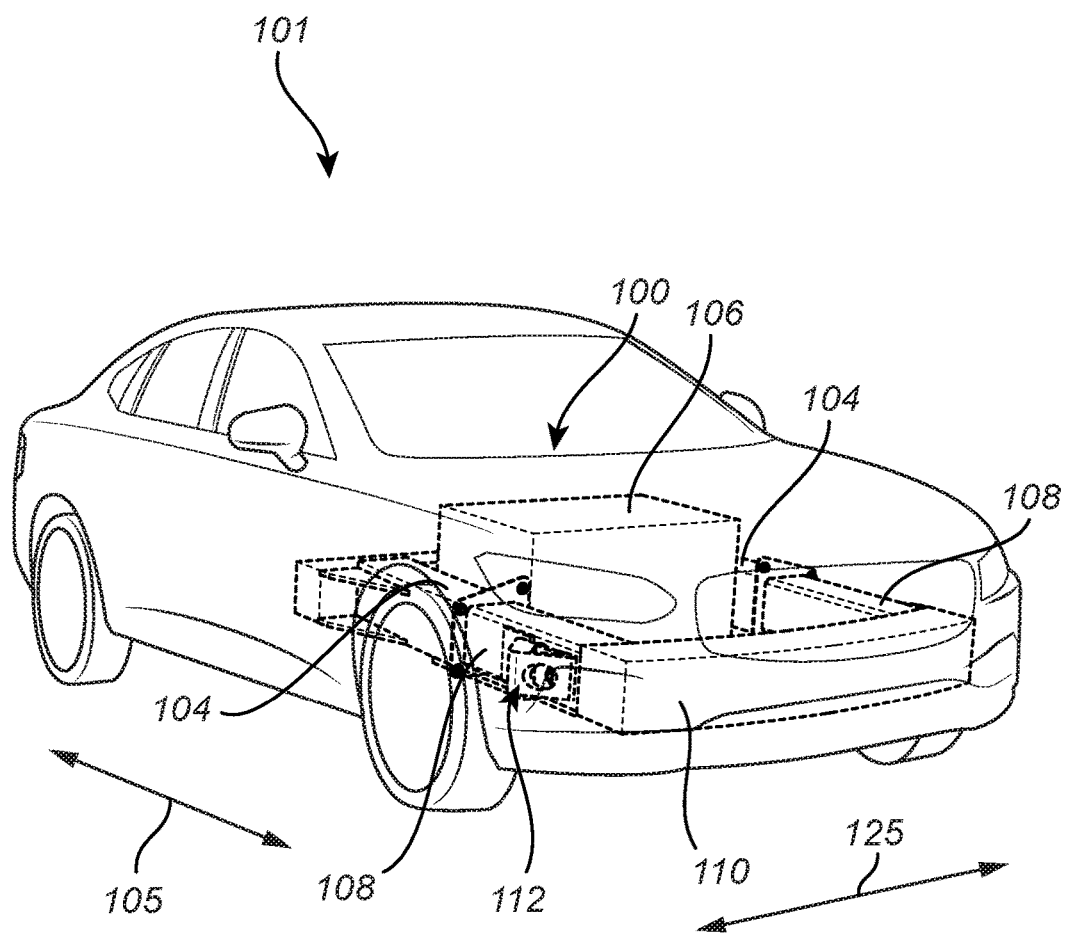
FIG. 1 schematically illustrates a vehicle comprising a front bumper system.

In the present detailed description, various embodiments of the system and method according to the present invention are mainly described with reference to a car. However, the present invention may equally be used for any other type of vehicle such as e.g. a truck, or a bus. Thus, this invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 shows a vehicle in the form of a car 101. The car 101 comprises a front bumper system 100. The front bumper system is arranged in the front portion of the vehicle, i.e. the front bumper beam 110 is facing in a forward direction of the vehicle and is disposed in a lateral direction 125 with respect to a front-rear direction 105 of the vehicle 101. The front bumper beam 110 is mechanically fixated to each of a pair of crash box units 108. The front bumper beam 110 may be mechanically fixated to the crash box units 108 by e.g. welding or with bolts. It should be noted that the front bumper beam 110 is part of the frame body of the vehicle 101. The crash box units 108 are arranged to absorb collision energy in the event of a front collision on the vehicle 101. Front side members in the form of beams 104 are arranged along opposite sides of the car 101 along the front-rear direction 105 and are each attached to a respective crash box unit 108. The front side members 104 are arranged on opposite sides of a cross member structure 106. The cross member structure may for example be a vehicle engine structure. However, other types of cross engine structure are equally applicable, such as a beam structure extending at least partly across the width of the vehicle such that a load transfer path may be provided via the beam. A lateral push element 112 is mechanically fixated to one of the crash box units by a screw-nut connection (not shown). In FIG. 1, a single lateral push element 112 is shown attached to the crash box unit 108 on one side of the vehicle 101. However, there may of course be a lateral push element also on the crash box unit on the other side of the vehicle 101. The front side members 104 are generally used for absorbing energy in the event of a crash.

A lateral push element 112 may be made entirely from aluminum or at least comprise aluminum as the majority material. This provides for a rigid lateral push element 112 which is light-weight as relatively straight-forward to manufacture by extrusion.

Figure 2A:
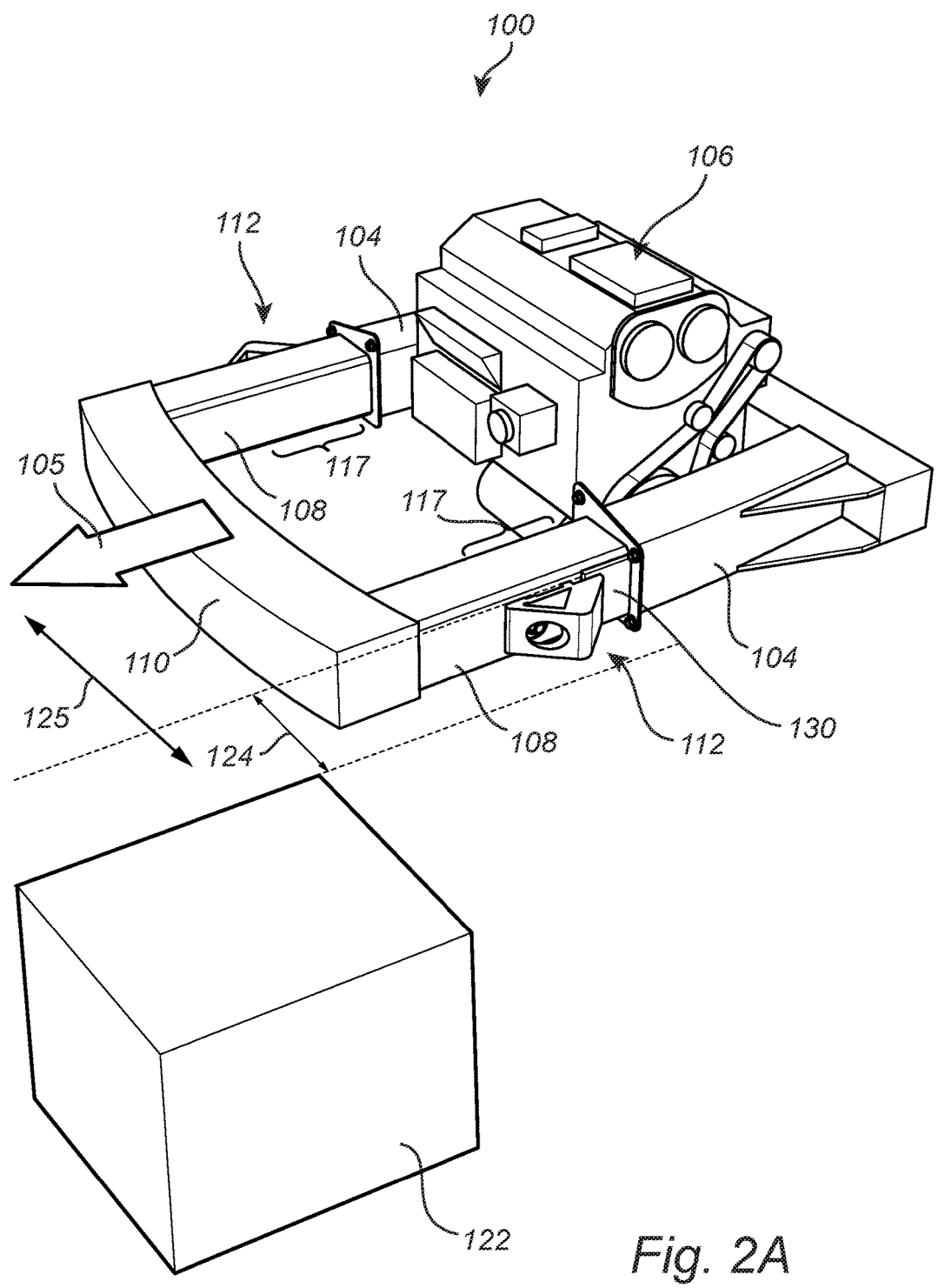
FIG. 2a is a conceptual drawing of a front bumper system before a crash.
Figure 2B:
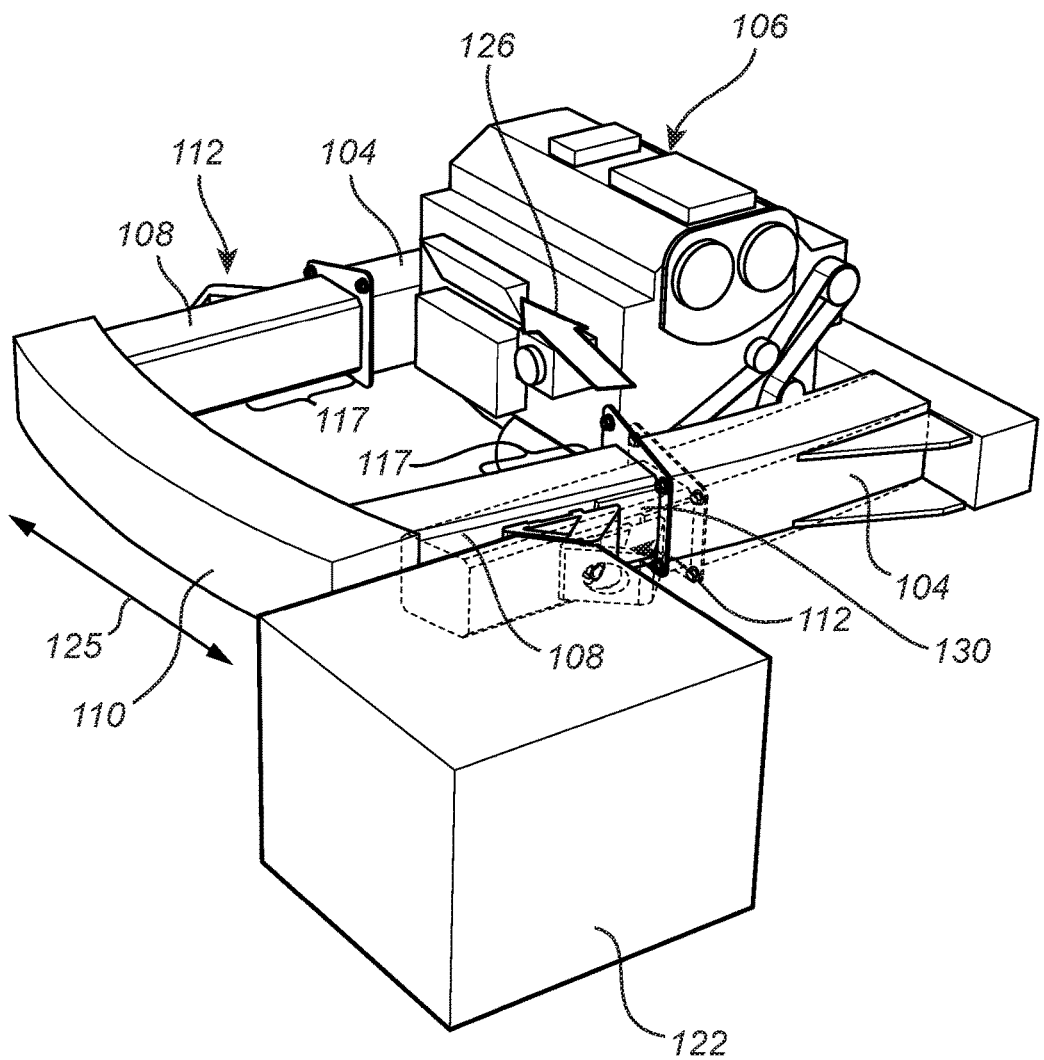
FIG. 2b is a conceptual drawing of a front bumper system in the event of a crash.

FIG. 2a conceptually illustrates a front bumper system 100 and FIG. 2b conceptually illustrates a front bumper system 100 in the event of a collision. In FIG. 2a-b, the pair of front side members 104 are arranged on opposite sides of the engine structure 106 (e.g. the engine itself, transmission, etc) and along a front-rear direction of the vehicle (see FIG. 1). Crash box units 108 are mechanically fixated to the front side members 104. The crash box units 108 are mechanically fixated to a front bumper beam 110 laterally disposed with respect to the front side members 104. A lateral push element is 112 is mechanically fixated to one of the crash box units 108, at a rear end portion 117 of the crash box. The rear end portion 117 is adjacent to the front side member 104. FIG. 2a illustrates an object 122 approaching the vehicle (or the vehicle is approaching the object) front bumper beam 110. In FIG. 2a, the front bumper system 100 is in its initial condition before a crash event. Thus, the object 122 is on collision course with the vehicle 101. The object 122 approaches such that a small overlap 124 is present between the vehicle 101 and the object 122, i.e. a small overlap collision is about to occur.

In FIG. 2b, the small overlap collision occurs. As shown, the object 122 has imparted on the lateral push element 112. The lateral push element 112 protrudes away from the crash box unit 108 further than the front bumper 110, such that the lateral push element 112 is the first part that imparts the object, and the front bumper beam 110 is clear of the object 122. Furthermore, in this particular embodiment, the crash box unit 108 and the front bumper beam 110 extend equally in the lateral direction 125. As the object hits the lateral push element 112, the lateral push element 112 transfers the load to the crash box unit 108 and the front side member 104 which transfers the load, as indicated by arrow 126, to the opposing front side member 104 at the same time as it moves towards the opposing front side member. In this way, the vehicle moves sideways which alleviates the consequences of the impact.

Figure 3:
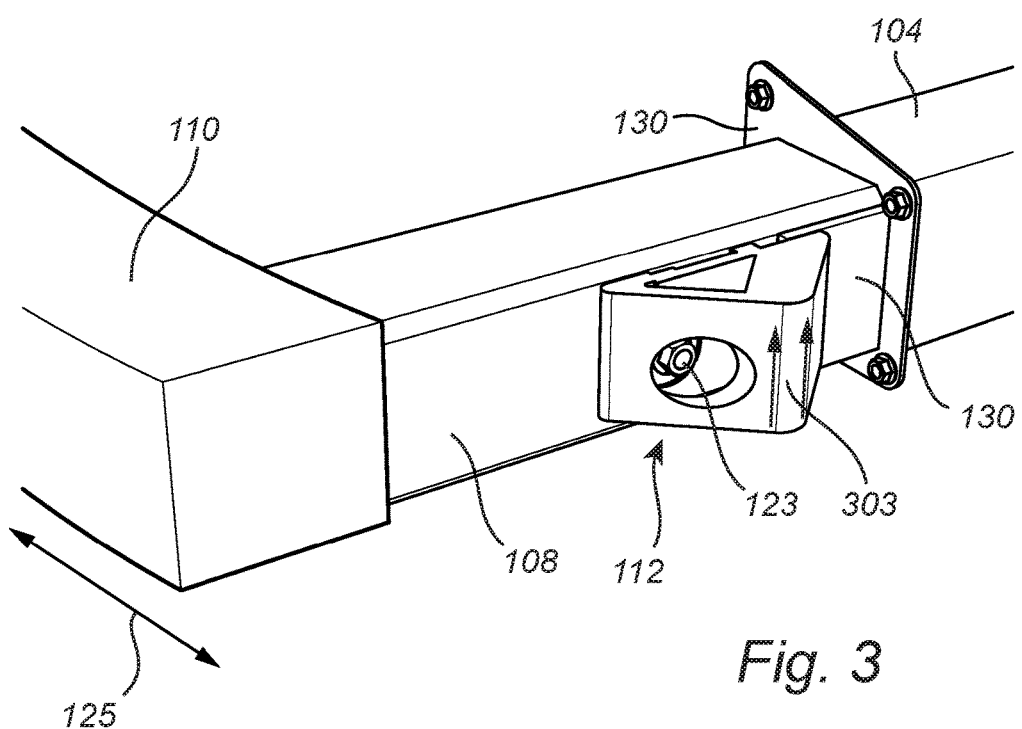
FIG. 3 conceptually illustrates a lateral push element attached to a crash box.

FIG. 3 conceptually illustrates a lateral push element 112 mechanically fixated to a crash box unit 108. In FIG. 3a, the lateral push element 112 is mechanically fixated to the crash box unit 108 by means of a screw (the term "screw" also includes the use of a bolt) 123 which is arranged in a through-hole (not shown) of the lateral push element 112 and into the crash box unit 108 and secured with a nut (not shown). Another option according to embodiments of the invention for mechanically fixing the lateral push element 112 to the crash box unit 108 is by using a rivet arranged in the through-hole.

In FIG. 3 the lateral push element 112 is arranged with the extrusion direction, indicated by arrows 303, substantially perpendicular to the lateral direction 125.

Additionally, in FIG. 3, and FIG. 2a-b, there is indicated a reinforcement element 130 arranged in contact with the crash box unit 108 and the lateral pusher element 112. The reinforcement element 130 is adapted to reinforce the crash box unit 108 against the lateral forces from the lateral push element 112 in the event of a crash. The reinforcement element 130 extends partly between the lateral push element 112 and the crash box unit 108 and is attached at the intersection between the crash box unit 108 and the front side member 104. The reinforcement element is arranged in contact with the surface of the crash box unit 108 between the crash box unit 108 and the lateral push element 112. The reinforcement element 130 is preferable made from aluminum or an aluminum alloy.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A front bumper system for a vehicle, said front bumper system comprising:
   a pair of front side members arranged along a front-rear direction of the vehicle, said pair of front side members being arranged on opposite sides of said vehicle and on opposite sides of a cross member structure of the vehicle;
   a pair of crash box units, wherein one of the crash box units is mechanically fixated to one of said front side members, and the other one of said crash box units being mechanically fixated to the other one of the front side members, said crash box units being configured to absorb collision energy by being deformed in the event of a collision;
   a front bumper laterally disposed with respect to said front-rear direction of the vehicle and mechanically fixated to each of the crash box units, and
   a lateral push element mechanically fixed to one of said crash box units and protruding in a lateral direction from said crash box unit with respect to said front-rear direction of said vehicle and towards the side of the vehicle at which the crash box unit is arranged, said lateral push element being mechanically fixated only to said crash box unit, said lateral push element being arranged to, in the event of a collision, provide a load transfer path for transferring a load, via said cross member structure towards the opposing front side member, whereby at least the front side member on the side of the lateral push element is adapted to move in response to said load transfer towards the opposing front side.

2. The front bumper system according to claim 1, wherein said lateral push element is mechanically fixated to a rear end portion of one of said crash box units.

3. The front bumper system according to claim 1, wherein said lateral push element is adapted to protrude further in said lateral direction compared to said front bumper.

4. The front bumper system according to claim 1, wherein said crash box units are arranged to extend further or equal in the lateral direction compared to an arrangement of the front bumper.

5. The front bumper system according to claim 1, wherein said lateral push element comprises aluminum.

6. The front bumper system claim 1, wherein said lateral push element is manufactured by extrusion.

7. The front bumper system according to claim 6, wherein said lateral push element is arranged with the extrusion direction substantially perpendicular to said lateral direction.

8. The front bumper system according to claim 1, wherein the lateral push element is mechanically fixated to said crash box by a screw and nut, or a riveting fastening means.

9. The front bumper system according to claim 1, wherein said front side members are arranged such that said load transfer path is via the cross member structure.

10. The front bumper system according to claim 9, wherein the cross member structure is a vehicle engine structure.

11. The front bumper system according to claim 1, comprising a reinforcement element arranged between a front side member and a respective crash box unit, the reinforcement element is adapted to mechanically reinforce the crash box unit in the lateral direction, wherein a portion of the reinforcement element is arranged to extend between a crash box unit and the lateral push element and in contact with the crash box unit.

12. A vehicle comprising the front bumper system according to claim 1.

* * * * *